United States Patent [19]

Gartland, Jr.

[11] 4,355,198
[45] Oct. 19, 1982

[54] SCREW RETAINING AND ALIGNING COVER PLATE

[75] Inventor: Albert J. Gartland, Jr., Trumbull, Conn.

[73] Assignee: Harvey Hubbell Incorporated, Orange, Conn.

[21] Appl. No.: 226,127

[22] Filed: Jan. 19, 1981

[51] Int. Cl.³ .............................................. H02G 3/14
[52] U.S. Cl. ...................................... 174/66; 220/241; 220/328
[58] Field of Search ............................ 174/66, 67, 53; 220/241, 242, 327, 328; 339/133 R, 123

[56] References Cited

U.S. PATENT DOCUMENTS

| Re. 29,752 | 9/1978  | Jaconette, Jr. ................... 339/14 R |
| 1,927,780  | 9/1933  | Anderson ........................... 220/24 |
| 2,399,958  | 5/1946  | Tinnerman ........................... 85/32 |
| 2,492,115  | 12/1949 | Crowther ....................... 174/66 X |
| 2,800,247  | 7/1957  | Appleton ........................... 220/55 |
| 3,155,808  | 11/1964 | Wiley ............................... 200/172 |
| 3,173,265  | 3/1965  | Bixby ............................... 60/54.6 |
| 3,263,949  | 8/1966  | Conrad . |
| 3,394,747  | 7/1968  | Duffy ................................. 151/69 |
| 3,432,793  | 3/1969  | Muska et al. ...................... 339/14 |
| 3,876,821  | 4/1975  | Pringle ............................. 174/53 |
| 3,967,049  | 6/1976  | Brandt .............................. 174/53 |
| 3,969,011  | 7/1976  | Yamada .......................... 339/125 R |
| 4,009,797  | 3/1977  | Lee .................................. 220/242 |
| 4,025,144  | 5/1977  | Thibeault ...................... 174/53 X |

Primary Examiner—B. A. Reynolds
Assistant Examiner—D. A. Tone
Attorney, Agent, or Firm—Jerry M. Presson

[57] ABSTRACT

A cover plate for completing the enclosure of an outlet box, the plate having a mounting screw retaining and aligning assembly integrally formed in an aperture in the plate. This assembly engages and aligns the screw so that the screw will not inadvertently fall out of the plate and the longitudinal axis of the screw is substantially perpendicular to the plate for ease of insertion of the screw into an internally threaded bore coupled to the box. The assembly comprises a pair of opposed, spaced flexible major webs integrally formed with the plate and extending into the aperture; and a pair of opposed, spaced flexible minor webs also integrally formed with the plate and the major webs and extending into the aperture. The major webs have parallel, straight distal edges which form chords of a circular aperture in the plate. The minor webs are in the form of ring segments. The assembly further comprises a countersink formed in the aperture and coaxial with that part of the aperture containing the webs. The outlet box can contain an electrical device such as a switch or receptacle and can be located in a wall.

36 Claims, 17 Drawing Figures

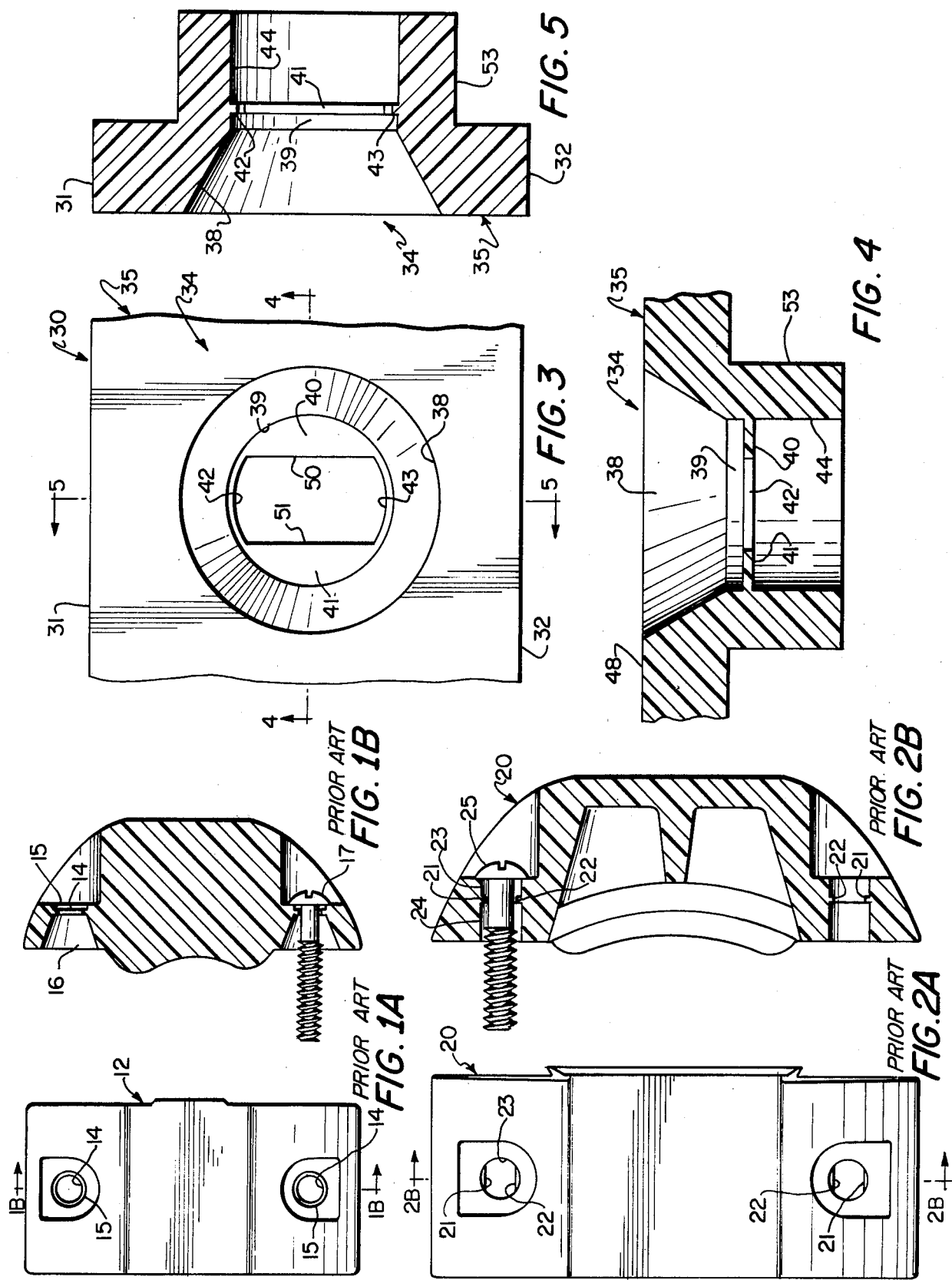

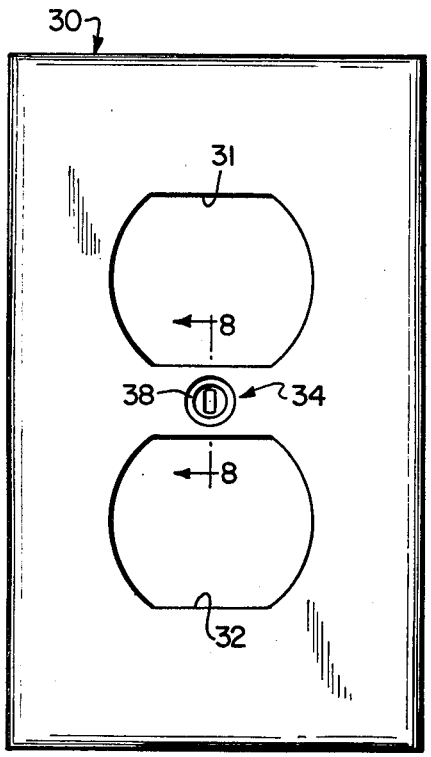
FIG. 6
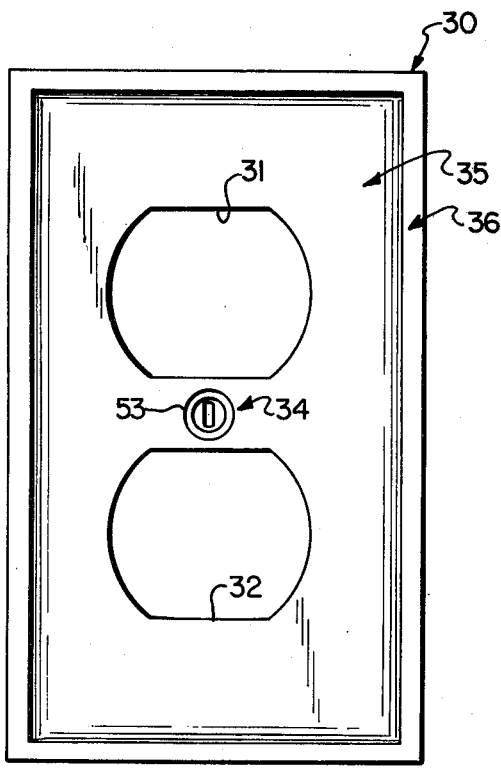
FIG. 7
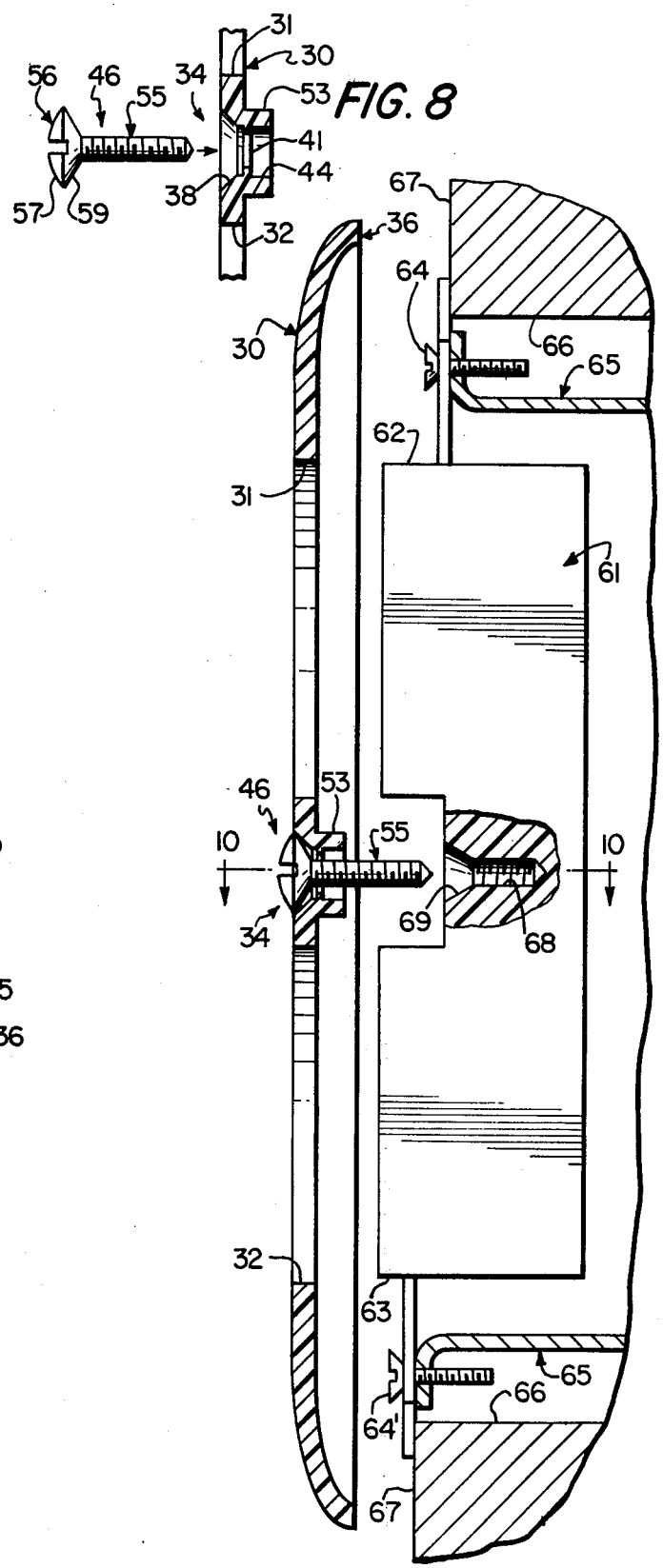
FIG. 8
FIG. 9

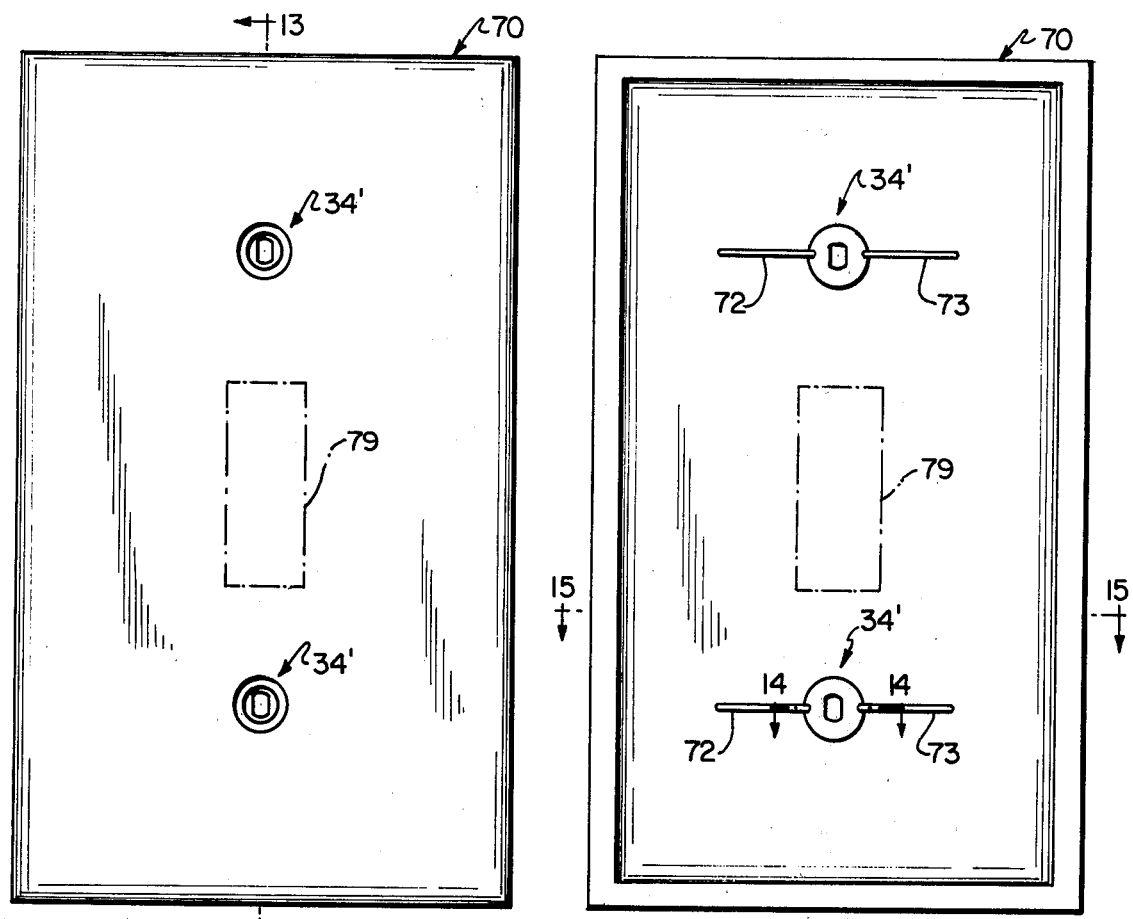
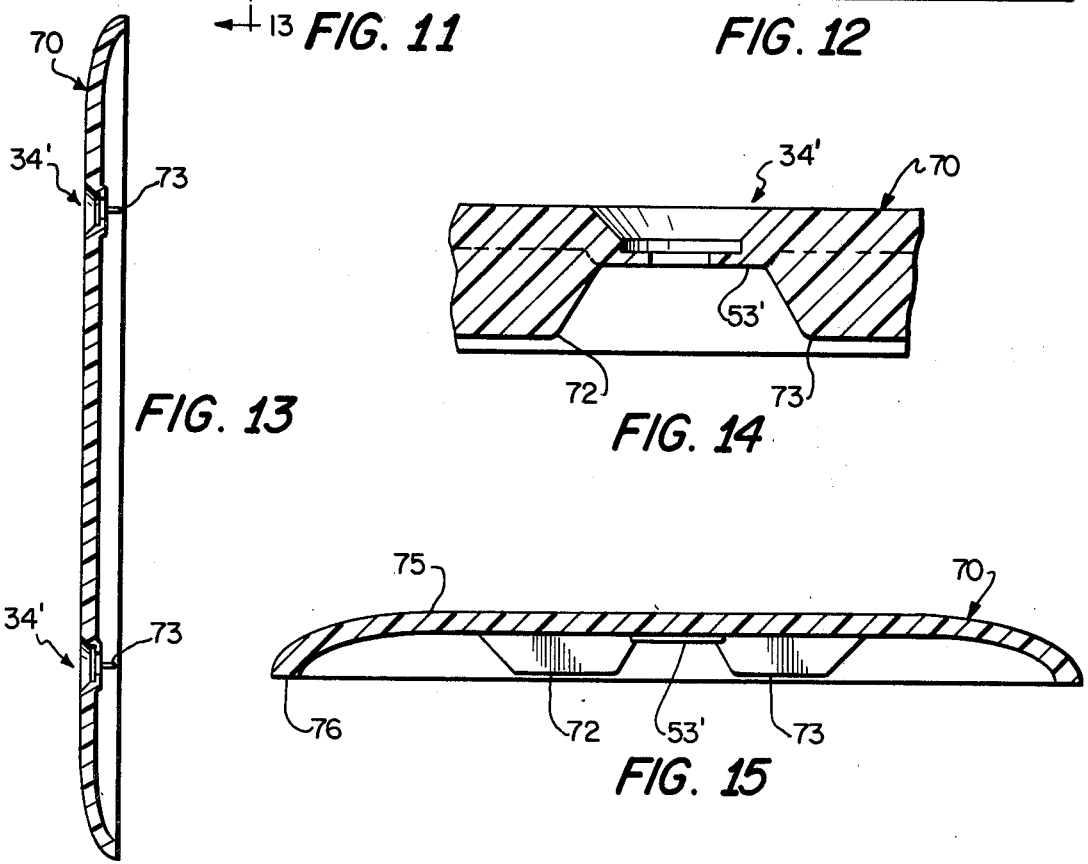

SCREW RETAINING AND ALIGNING COVER PLATE

FIELD OF THE INVENTION

The invention relates to a cover plate for completing the enclosure of an outlet box, the plate having a mounting screw retaining and aligning assembly integrally formed in an aperture in the plate. The cover plate can be used as a wall plate to complete the enclosure of an outlet box located in a wall. The outlet box may be used to house and mount various types of electrical wiring or connective devices, such as switches, receptacles, motor outlets, telephone and television connective devices and the like. If there is no device in the box, the wall plate is designed as a blank having only apertures for receiving the mounting screws. In all other cases, the plate has openings to suit the purpose of the device.

BACKGROUND OF THE INVENTION

As anyone who has removed and tried to replace a cover plate for an electrical wall switch or outlet knows, the screws used are very small and tend to fall out of the aperture in the plate. This can occur during removal or installation of the plate. Sometimes the screw merely falls to the floor where it can be retrieved easily, although this does waste time. In other situations, sometimes the screw falls into an inaccessible area and thus another screw must be obtained, which wastes even more time. This problem is of course also encountered by the commercial construction electrician who, for example, is installing literally thousands of these cover plates in a new large office building. Complicating this problem is the widespread use of plastic cover plates of various different colors, such as ivory, brown, black and red, which have prepainted mounting screws to match the color of the plate. Thus, the installer cannot substitute just any extra screw if a color matched screw is lost and must waste additional time obtaining a substitute screw of the correct color.

Another problem associated with installing such cover plates is the difficulty of aligning the relatively small screw with the internally threaded bore provided on the switch or outlet assembly and inserting the screw into the front of the bore to make the necessary threaded connection. It is difficult to align the screw and find the threaded bore because the screw tends to pivot in the aperture in the cover plate. Of course, when there is a misalignment, the screw tends to fall out of the cover plate, especially since the screw and therefore the notch in the head is so small and easily slips from a screw driver used therewith.

SUMMARY OF THE INVENTION

Accordingly, a primary object of the present invention is to provide a screw retaining and aligning cover plate for completing the enclosure of an outlet box so that the screw does not fall from the plate and the screw is easily inserted into an internally threaded bore coupled to the box.

Another object of the present invention is to provide such a screw retaining and aligning cover plate that is inexpensive and easy to manufacture and is reusable.

Another object of the present invention is to provide such a cover plate that includes a retaining and aligning assembly integrally formed with the plate.

Another object of the present invention is to provide such a cover plate that can retain and align a screw upon merely pushing the screw into an aperture in the plate.

Another object of the present invention is to provide a cover plate with a screw retaining and aligning assembly that does not deleteriously effect the aesthetics of a conventional cover plate, is unobstructive, blends into the contour of the plate, and is covered by the head of the mounting screw.

The foregoing objects are basically attained by providing a plate for completing the enclosure of an outlet box, the plate being secured adjacent the box by means of a threaded member receivable in a threaded bore coupled to the box, the combination comprising a generally planar body portion; means defining an aperture in the body portion for receiving the threaded member therethrough; and means on the body portion and extending into said aperture for engaging a threaded portion of the threaded member when the member is fully inserted into said aperture to align the longitudinal axis of the threaded member substantially perpendicular to the body portion for ease of insertion of the threaded member into the threaded bore coupled to the box.

Advantageously, the means for engaging the threaded member or screw comprises a pair of opposed, spaced flexible webs integrally formed with the body portion and extending into the aperture. Each of the webs is in the form of a chordal segment of a circle and these webs have straight, parallel distal edges receiving the threaded member therebetween. In addition to these large or major webs, the means for engaging includes a pair of opposed, spaced minor webs integrally formed with the body portion and the major webs and extending into the aperture. These minor webs are in the form of ring segments. Also forming the means for engaging is an inwardly and downwardly tapered frustoconical bore, i.e., a countersink, formed in the body portion coaxially with the aperture to coact with the major webs in aligning the screw or threaded member which has an inwardly and downwardly tapered frustoconical surface on the bottom of the head thereof.

Advantageously, the ratio of the largest major web radial width to the diameter of the bore or aperture from which the major webs extend is between about 1:3.70 to about 1:4.88. In addition, advantageously the ratio of the major web thickness to the largest major web radial width is between about 1:2.86 to about 1:5.00. The plate, and therefore the integral webs, are formed from polymeric material which is thermoplastic or or any other material having resilient and flexible rather than brittle properties.

Other objects, advantages and salient features of the present invention will become apparent from the following detailed description which, taken in conjunction with the annexed drawings, discloses a preferred embodiment of the present invention.

DRAWINGS

Referring now to the drawings which form a part of this original disclosure:

FIG. 1A is a top plan view, not to scale, of a prior art upper jaw for a cable clamp having an annular flange located inside a bore for receiving a screw;

FIG. 1B is a sectional view taken along lines 1B—1B in FIG. 1A;

FIG. 2A is a top plan view, not to scale, of another prior art upper jaw for a cable clamp with a pair of opposed fins located in a bore receiving a screw therein;

FIG. 2B is a sectional view taken along lines 2B—2B in FIG. 2A;

FIG. 3 is a fragmentary, front elevational view of a cover plate in accordance with the present invention substantially to scale and showing the two opposed major webs, two opposed minor webs and the frustoconical bore, all integrally formed in the cover plate;

FIG. 4 is a bottom plan view in section taken along lines 4—4 in FIG. 3;

FIG. 5 is a side elevational view in section taken along lines 5—5 in FIG. 3;

FIG. 6 is a front elevational view of a duplex receptacle cover plate in accordance with the present invention;

FIG. 7 is a rear elevational view of the cover plate shown in FIG. 6;

FIG. 8 is a fragmentary side elevational view in section taken along lines 8—8 in FIG. 6 showing a screw about to be inserted into the cover plate;

FIG. 9 is a side elevational view in vertical section of a cover plate in accordance with the present invention having a screw inserted therein and aligned with the internal threaded bore in a duplex receptacle located in an outlet box with the screw about to be inserted into the bore;

FIG. 11 is a front elevational view of a cover plate in accordance with the present invention having two screw receiving apertures therein;

FIG. 12 is a rear elevational view of the cover plate shown in FIG. 11 with two ribs extending outwardly from each of the screw receiving apertures;

FIG. 13 is a side elevational view in section taken along lines 13—13 in FIG. 11;

FIG. 14 is a top plan sectional view taken along lines 14—14 in FIG. 12 and enlarged; and FIG. 15 is a top plan sectional view taken along lines 15—15 in FIG. 12 and enlarged, this enlargement being less than the enlargement of FIG. 14.

PRIOR ART

Figure 10:
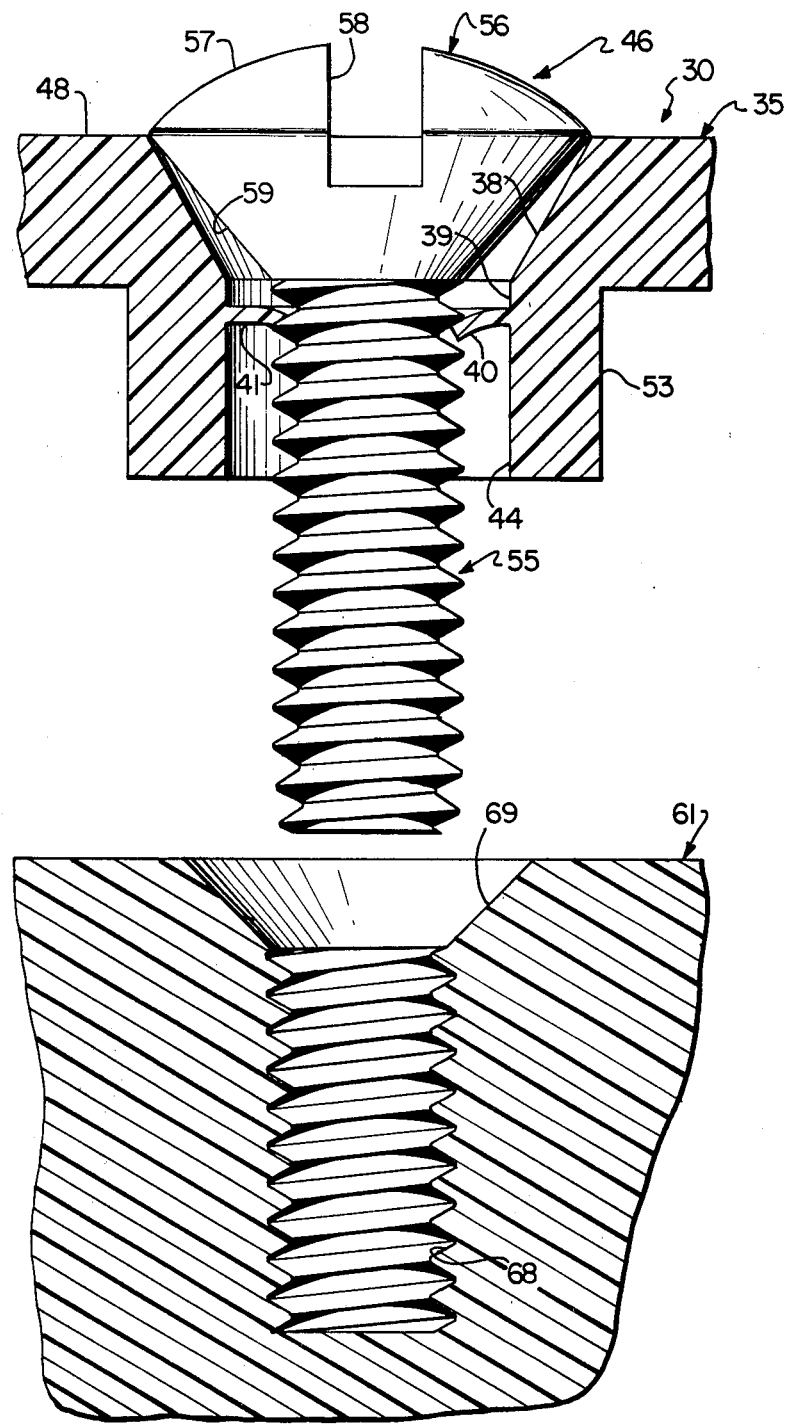
FIG. 10 is a top plan sectional view taken along lines 10—10 in FIG. 9 showing a screw retained and aligned in a cover plate and about to be inserted into an internally threaded bore, this figure being to scale where one inch equals 0.1 inch.

In the patent literature, applicant is unaware of any prior device that addresses the problem as set forth above and solves it in the manner set forth herein. However, there are a number of U.S. patents that are relevant to the claimed invention including U.S. Pat. Nos. 1,927,780 to Anderson; 2,399,958 to Tinnerman; 3,155,808 to Wiley; 3,173,265 to Bixby; 3,432,793 to Muska et al; 3,969,011 to Yamada; 4,009,797 to Lee; and Re. 29,752 to Jaconette, Jr.

In addition to this patent literature, applicant is aware of two prior art devices, the first being shown in FIGS. 1A and 1B and the other being shown in FIGS. 2A and 2B.

Referring to FIGS. 1A and 1B, a removable part or upper jaw 12 of a cable clamp is illustrated, these drawings not being to scale. A full description of this jaw 12 in general is found in U.S. Pat. No. 3,571,781 issued to Gartland et al. Although not shown in the patent, devices have been made and sold which include, as seen in FIGS. 1A and 1B, an annular flange 14 located in an aperture and having a slightly larger cylindrical bore 15 above the flange and a frustoconical bore 16 below the flange, the smaller diameter of the frustonconical bore being substantially the same as the base diameter of the annular flange 14 and cylindrical bore 15.

This combination of the annular flange, cylindrical bore and frustoconical bore are duplicated at the other end of the jaw 12 which is illustrated having a screw 17 received therein.

Since FIGS. 1A and 1B are not to scale, set forth below is Table 1 which includes the various pertinent dimensions and ratios of the annular flange 14 relative to bores 15 and 16.

TABLE 1

| | PRIOR ART FLANGE OF FIGS. 1A AND 1B | |
|---|---|---|
| 1. | Diameter of bore 15 from which annular flange 14 extends | 0.145–0.147 inch |
| 2. | Inner diameter of flange 14 | 0.134–0.136 inch |
| 3. | Flange 14 radial width | 0.009–0.013 inch |
| 4. | Minor radial width | none |
| 5. | Thickness of flange 14 | 0.009–0.011 inch |
| 6. | Ratio of flange 14 radial width (3) to diameter of bore 15 from which flange extends (1) | 0.061–0.089 (1:16.39–1:11.23) |
| 7. | Ratio of flange 14 thickness (5) to flange 14 radial width (3) | 0.692–1.222 (1:1.45–1:0.82) |
| 8. | Screw 17 used with flange 14 (a) major diameter (b) minor diameter | No. 6/20 0.138 inch 0.0974 inch |

As seen in Table 1, the ratio of the flange 14 radial width to the diameter of the bore 15 from which the flange extends is from about 1:11.23 to 1:16.39. Thus, the flange is extremely small relative to the bore size, substantially smaller than is shown in the non-scale drawing of FIGS. 1A and 1B.

In addition, from Table 1 it is seen that the ratio of the flange 14 thickness to the flange radial width is about 1:0.82 to 1:1.45 so that the thickness is substantially the same as the width of the flange.

The material used to construct jaw 12 is thermoplastic such as nylon sold by DuPont under the trademark Zytel.

The purpose of the flange 14 used in jaw 12 is merely to maintain the screw 17 in the aperture in the upper jaw so that it does not easily fall out when the jaw is inverted. This occurs since the major diameter of the threads of screw 17 is greater than the inner diameter of the undeformed annular flange 14. As seen in FIG. 1B, a smooth part of the screw shank is received by the annular flange 14 after the threaded part is pushed through the flange, unlike the present invention where the webs grip a threaded part of a screw. The jaw 12 and annular flange 14 provide no alignment capability, especially because of the play between the outer diameter of the smooth shank and the inner diameter of the annular flange 14. Due to the relatively small size of the flange's width, it can be sheared by the threads of the screw being pushed therethrough. The upper jaw 12 also tends to be backed off by the screw on unscrewing.

Referring now to FIGS. 2A and 2B, another prior art upper jaw 20 for a cable clamp is shown, not to scale, which includes in an aperture two opposed fins 21 and 22 with two cylindrical bores 23 and 24 formed on opposite sides of the fins, bore 24 having a slightly larger diameter than bore 23. A general description of jaw 20 is provided in U.S. Pat. No. 3,784,961 to Gartland, Jr. which, however, does not disclose the fins shown in FIGS. 2A and 2B.

As seen in these figures, a screw 25 is received in bores 23 and 24 as well as between fins 21 and 22. In operation the smooth shank is received between fins 21 and 22, the major diameter of the threads being slightly greater than the distance between the fins to maintain the screw 25 in jaw 20, if for example jaw 20 were inverted. However, there is no alignment capability or requirement in this jaw 20.

Since FIGS. 2A and 2B are not to sclae, set forth below is Table 2 which includes particular dimensions and ratios of fins 21 and 22 relative to bores 23 and 24.

TABLE 2

| PRIOR ART FINS OF FIGS. 2A AND 2B | | |
|---|---|---|
| 1. | Diameter of bore 23, 24 from which fins 21, 22 extend | 0.171 inch (above) 0.180 inch (below) |
| 2. | Separation of distal edges of fins 21, 22 | 0.156–0.158 inch |
| 3. | Largest fin 21, 22 radial width | 0.0065–0.0075 (above) 0.0110–0.0120 (below) |
| 4. | Minor fin 21, 22 radial width | none |
| 5. | Thickness of fin 21, 22 | 0.008–0.010 inch |
| 6. | Ratio of largest fin 21, 22 radial width (3) to diameter of bore 23, 24 from which fins extend (1) | 0.038–0.043 (above) (1:26.32–1:23.26) 0.061–0.066 (below) (1:16.39–1:15.15) |
| 7. | Ratio of fin 21, 22 thickness (5) to largest fin 21,22 radial width (3) | 1.066–1.538 (above) (1:0.94–1:0.65) 0.666–0.909 (below) (1:1.5–1:1.1) |
| 8. | Screw 25 used with fins 21, 22 (a) major diameter (b) minor diameter | No. 8/18 0.1640 inch 0.1234 inch |

As seen from Table 2, the ratio of the largest fin radial width to the diameter of bores 23 and 24 from which the fins extend is about 1:26.32–1:23.26 relative to bore 23 and about 1:16.39–1:15.15 relative to bore 24. Thus, the fins are extremely small relative to the bores receiving them.

In addition, the ratio of the fin thickness to the largest fin radial width is about 1:0.94–1:0.65 for bore 23 and about 1:1.5 to 1:1.1 for bore 24. Thus, each of the fins is about as thick as it is wide in its largest radial width.

The flexibility of these fins is not especially critical in these devices because these screws are initially installed at the factory with the aid of machine-powered screwdrivers. In addition, the use of a No. 8/18 screw, rather than a No. 6/32 as in the present invention, means that a lesser number of threads per inch are present and thus the threads are coarser. This allows greater latitude in displacing the screw transversely so that the threads can be "walked" through the less flexible fins, either inwardly or outwardly of the aperture.

The material used to construct jaw 20 is also thermoplastic such as nylon sold by DuPont under the trademark Zytel.

DETAILED DESCRIPTION OF THE INVENTION

Referring now to FIGS. 3–10, the present invention is illustrated in a duplex receptacle cover plate 30 having, as seen in FIG. 6, upper and lower openings 31 and 32 for two female connectors and a central aperture 34. As seen from the rear in FIG. 7, the cover plate 30 is comprised of a generally planar, main body portion 35 with a peripheral flange on the inner surface of the body portion 35. The plate is resilient and flexible and is made from thermoplastic nylon such as that material sold by DuPont under the trademark Zytel FE-3221.

As best seen in FIGS. 3, 4 and 5, the central aperture 34 comprises a frustoconical bore 38, a cylindrical bore 39, two opposed major webs 40 and 41, two opposed minor webs 42 and 43 and a cylindrical bore 44. All of these form a retaining and aligning assembly for a threaded member or screw 46, as seen in FIG. 8, to be inserted in the aperture 34 and carried by the plate 30.

The frustoconical bore countersink 38 is downwardly and inwardly tapered, includes an angle of about 82° and extends into the body portion 35 from the outer substantially planar surface 48.

The cylindrical bore 39 is coaxial with cylindrical bore 38 and extends inwardly from the innermost and smallest diameter end of the frustoconical bore 38.

As seen in FIG. 3, the part of aperture 34 into which the major and minor webs 40-43 extend, is substantially circular being defined by cylindrical bores 39 and 44. These webs are initially molded with and are therefore integral or unitized with the main body portion 35 of the plate.

The distal edges 50 and 51 of the major webs 40 and 41 are straight and parallel and form chords of a circle defined by the bores 39 and 44. In plan view each major web is a chordal segment. The major webs have the same size and shape and their outer surfaces are substantially planar and coplanar and their inner surfaces are also substantially planar and coplanar as seen in FIGS. 3, 4 and 5.

The two opposed minor webs 42 and 43 are also integrally formed with the body portion 35 and are also integrally formed with each of the major webs 40 and 41 during the molding of the plate. In plan view each of the minor webs is a ring segment, the distal edges thereof being a portion of a cylinder. The outer surfaces of the minor webs are substantially planar and coplanar and the lower surfaces are also substantially planar and coplanar. In addition, all of the outer surfaces of all four webs are substantially coplanar and all of the inner surfaces of all four webs are substantially coplanar.

The cylindrical bore 44 is formed from a cylindrical boss 53 integrally formed with the body portion 35 and extending inwardly therefrom, the cylindrical bore 44 extending inwardly from the base of each of the major and minor webs. Bores 39 and 44 have substantially the same inner diameter.

While the various parts shown in FIGS. 3–5, and 10, are to scale, Table 3 is set forth below including the important dimensions and ratios of the webs relative to the plate 30.

TABLE 3

| WEBS OF FIGS. 3-15 | | |
|---|---|---|
| 1. | Diameter of bore 39 from which major webs 40, 41 extend | 0.190 ± 0.005 inch |
| 2. | Separation of major web 40, 41 distal edges | 0.100 ± 0.005 inch |
| 3. | Largest major web 40, 41 radial width | 0.045 ± 0.005 inch |
| 4. | Minor web 42, 43 radial width | 0.010 ± 0.005 inch |
| 5. | Thickness of major and minor webs | 0.012 ± 0.002 inch |
| 6. | Ratio of major web radial width (3) to diameter of bore from which major web extends (1) | 0.205–0.270 (1:4.88–1:3.70) |
| 7. | Ratio of major web thickness (5) to major web radial width (3) | 0.200–0.350 (1:5.00–1:2.86) |
| 8. | Screw used with webs (a) major diameter (b) minor diameter | No. 6/32 0.134 ± 0.003 inch 0.099 ± 0.002 inch |

As seen from Table 3, the ratio of the major web radial width to the diameter of the bore 39 from which the webs extend is between about 1:3.70 to about 1:4.88. Thus, the major webs are flexible.

In addition, the ratio of the major web thickness to the major web radial width is between about 1:2.86 to about 1:5.00, which contributes to the flexibility of the major webs.

As seen in FIGS. 8, 9 and 10, the screw 46 is a conventional No. 6/32 screw, illustrated in FIG. 10 to scale. The designation "No. 6" indicates that, based on the American Standard Coarse And Find Threads definition, the basic major diameter, or the outer diameter, of the threads at the crest is 0.134 inch and the basic minor diameter, or the diameter of the roots of the threads, is 0.099 inch. The designation "/32" indicates that there are 32 threads per inch on the screw externally threaded body or shank 55 as seen to scale in FIG. 10.

In addition to the shank 55, the screw 46 includes a head 56 having a round top surface 57 penetrated by a notch 58 and a frustoconical bottom or underlying surface 59 tapered inwardly and downwardly and including about 45°.

Insertion Of The Screw Into The Plate

As seen in FIG. 8, the screw 46 is longitudinally aligned with aperture 34 in the plate 30. To insert the screw 46 into a retaining and aligning position in the plate 30, the screw is pushed through the aperture so that the screw threads flex and push the major webs 40 and 41 inwardly to the plate, away from the head 56 of the screw and radially outward of the shank 55 as best seen in FIG. 10. The webs are also slightly inelastically deformed. Thus, as insertion takes place, the threads on shank 55 index past the major webs and these webs engage and retain the screw therebetween, thus captivating the screw to the plate and preventing the screw from falling out of the plate. This insertion is complete when the frustoconical surface 59 on the bottom of the head 56 engages and seats on the frustoconical bore 38 in the aperture 34, as shown in FIG. 10.

In this configuration, the major webs 40 and 41 tightly grip and engage the opposing threads of the screw and retain, or captivate, the screw in the aperture. Moreover, this engagement of the major webs with the screw in combination with the seating of the frustoconical surface 59 of the screw head against the frustoconical bore 38 centers the head relative to the bore 38, thereby aligning the longitudinal axis of the screw shank 55 substantially perpendicular to the outer surface 48 of plate 30. This alignment is maintained by the substantially equal and opposite forces applied inwardly against the threads by the two webs.

In this configuration, the screw 46 is easily inserted into a threaded bore formed in an electrically insulated portion of an electrical receptacle or switch, such as a duplex receptacle 61 shown in FIGS. 9 and 10.

As is evident, the number of threads per inch in the No. 6/32 screw used with the present invention is much greater than the number of threads per inch in the No. 8/18 screw used with the prior art device of FIGS. 2A and 2B. With these finer threads of the No. 6/32 screw, pushing the screw axially of an aperture containing webs therein would tend to significantly shear these webs, if they were not very flexible. However, by making the webs rather flexible, as are major webs 40 and 41, they will flex significantly to permit passage of the threads without undue shearing.

Coupling The Plate To The Outlet Box

As seen in FIG. 9, a conventional duplex receptacle 61 having two sets of female contacts in portions 62 and 63 is secured via screws 64 and 64' within a metallic or plastic outlet box 65 which is rigidly and conventionally secured in an opening 66 in a wall 67.

Centrally formed in the receptacle 61 between the female contact portions 62 and 63 is an integrally threaded female connection or bore 68 for receiving the threaded shank 55 of the plate screw 46. If desired, this bore 68 can have a countersink 69 at its entrance and may be lined with a metal sleeve which is internally threaded to receive the wall plate screw.

After the screw 46 is secured in plate 30, as seen in FIGS. 9 and 10, the plate is maneuvered adjacent wall 67 and the shank 55 of the screw is inserted into internally threaded bore 68, at which time the screw is rotated clockwise relative to the plate and is threadedly coupled to the bore and the receptacle in a covering position. As this clockwise rotation takes place, the threads index relative to the webs, these webs flexing and sliding relative to the rotating threads. There is little tendency for the screw to back the plate outwardly.

Because the screw 46 is retained in the plate and aligned substantially perpendicular to the plate, the accurate insertion of the screw into the bore 68 is readily faciliatied and the screw does not tend to fall out of the plate.

Once the screw 46 is fully threaded into bore 68, the cover plate 30 completes the enclosure of outlet box 65 and is secured against wall 67 with flange 36 contacting the wall.

Cover Plate Of FIGS. 11-15

As seen in FIGS. 11-15, a slightly modified cover plate 70 is shown which has a plurality of apertures 34' formed therein, like aperture 34 described above, except for two differences. These include a shorter cylindrical boss 53 and two integral inwardly facing ribs 72 and 73 extending radially outward from the cylindrical boss 53 and transverse of the plate 70.

These ribs 72 and 73 extend inward from the main body portion 75 of plate 70, stopping short of the plane containing the edge of the peripheral flange 76 surrounding the main body portion 75.

This type of cover plate 70 can be used to close off an empty outlet box in a wall or, if a central rectangular aperture 79 shown in phantom in FIG. 11 were used, then the plate 70 could be used to cover a switch located in an outlet box. In an electrical switch, the metallic strap which is available to mount the plate is relatively thin, on the order of 0.060 inch. With this thickness only two threads can be formed in a bore in the strap for receiving the plate mounting screw and thus no countersink is available for guiding the mounting screw tip. Therefore, positioning and captivating the screw in the plate is very important.

Of course, any number of receptacles or switches can be covered by the plate illustrated herein with the aperture and webs in accordance with the present invention being provided in the necessary locations. Rather than merely using the plate illustrated herein for electrical receptacles or switches, it could be utilized with any type of electrical device having a cover plate coupled to a box receiving the device therein by means of a threaded member. One example would be a cover for a telephone modular jack supported in the wall. Others would be motor outlets and television connective devices.

While various advantageous embodiments have been chosen to illustrate the invention, it will be understood by those skilled in the art that various changes and modifications can be made therein without departing from the scope of the invention as defined in the appended claims.

What is claimed is:

1. A plate for completing the enclosure of an outlet box, the plate being adapted to be secured adjacent the box by means of a threaded member having a head, the member being receivable in a threaded bore coupled to the box, the plate comprising:
a generally planar body portion composed of a polymeric material;
means defining an aperture in said body portion for receiving the threaded member therethrough, said aperture having a countersink portion for seating the head of the threaded member thereon; and
flexible means integral with said body portion and extending into said aperture, for engaging a threaded portion of the threaded member when the member is fully inserted into said aperture to align the longitudinal axis of the threaded member substantially perpendicular to said body portion for ease of insertion of the threaded member into the threaded bore coupled to the box.

2. A plate according to claim 1, wherein
said means for engaging comprises a pair of opposed, spaced flexible webs integrally formed with said body portion and extending into said aperture.

3. A plate according to claim 2, wherein
said countersink comprises an inwardly and downwardly tapered frustoconical bore formed in said body portion.

4. A plate according to claim 2, wherein
said means for engaging further comprises a pair of opposed, spaced flexible minor webs integrally formed with said body portion and said webs and extending into said aperture.

5. A plate according to claim 4, wherein
each of said minor webs is in the form of a ring segment.

6. A plate according to claim 2, wherein
each of said webs is in the form of a chordal segment of a circle.

7. A plate according to claim 2, wherein
said webs have straight, parallel distal edges receiving the threaded member therebetween.

8. A plate for completing the enclosure of an outlet box comprising:
a body portion;
means defining a substantially circular aperture in said body portion; and
a pair of opposed, flexible webs integrally formed with said body portion and extending into said aperture,
said webs each having a distal edge forming a chord of said circular aperture,
the ratio of the largest radial width of each of said webs to the diameter of said aperture is between about 1:3.70 to about 1:4.88.

9. A plate according to claim 8, wherein
the ratio of the thickness of each of said webs to the largest radial width of each of said webs is between about 1:2.86 to about 1:5.00.

10. A plate according to claim 8, and further comprising
an inwardly and downwardly tapered frustoconical bore formed in said body portion coaxial with said aperture.

11. A plate according to claim 10, and further comprising
a cylindrical bore formed in said body portion between said frustoconical bore and said webs and coaxially aligned with said frustoconical bore.

12. A plate according to claim 8, and further comprising
a cylindrical boss integrally formed with said body portion, extending from said webs and being coaxially aligned with said aperture.

13. A plate for completing the enclosure of an outlet comprising:
a body portion;
means defining a substantially circular aperture in said body portion; and
a pair of opposed, flexible webs integrally formed with said body portion and extending into said aperture,
said webs each having a distal edge forming a chord of said circular aperture;
the ratio of the thickness of each of said webs to the largest radial width of each of said webs is between about 1:2.86 to about 1:5.00.

14. In a plate for completing the enclosure of an outlet box and being securable adjacent the box by means of a threaded member receivable in an aperture in the plate and an internally threaded bore coupled to the box and by means of a frustoconical surface on the head of the threaded member receivable in a countersink in the plate, the improvement comprising:
flexible web means, integrally formed with said plate and extending into said aperture, for engaging a threaded portion of said threaded member when said threaded portion is fully inserted into said aperture to align the longitudinal axis of said threaded member substantially perpendicular to the plate for ease of insertion of the threaded member into the threaded bore.

15. The plate according to claim 14, wherein
said web means comprises two webs located on opposite sides of said aperture.

16. The plate according to claim 15, wherein
said aperture is substantially circular, and said webs each have a distal edge forming a chord of said circular aperture.

17. the plate according to claim 16, wherein
said distal edges are substantially parallel.

18. The plate according to claim 17, wherein
the distance between said distal edges is less than the major diameter of said threaded member and greater than the minor diameter of said threaded member.

19. The plate according to claim 16, wherein
said distal edges of said two webs are substantially equal in length.

20. The plate according to claim 16, wherein
the ratio of the largest web radial width to the diameter of said circular aperture is between about 1:3.70 to about 1:4.88.

21. The plate according to claim 16, wherein
the ratio of each of said webs thickness to the largest web radial width is between about 1:2.86 to about 1:5.00.

22. The plate according to claim 16, and further comprising
two minor webs integrally formed with said plate and said webs and extending between said webs.

23. The plate according to claim 22, wherein each of said minor webs is in the form of a ring segment.

24. The plate according to claim 15, wherein the outer surfaces of said two webs are substantially parallel.

25. The plate according to claim 15, wherein the inner surfaces of said two webs are substantially parallel.

26. The plate according to claim 15, wherein said two webs have substantially the same thickness.

27. The plate according to claim 14, wherein said web means is formed of polymeric material.

28. The plate according to claim 14, and further comprising
a hollow boss integrally extending from the inner surface of said plate and axially aligned with said aperture.

29. The plate according to claim 14, and further comprising
a cylindrical bore formed in said aperture between said countersink and said web means.

30. The plate according to claim 14, and further comprising
a pair of ribs extending radially outward of said aperture and integrally formed with the inner surface of said plate.

31. In a plate composed of a polymeric material for completing the enclosure of an outlet box and being securable adjacent the box by means of a threaded member receivable in an aperture in the plate and an internally threaded bore coupled to the box and by means of a frustoconical surface on the head of the threaded member receivable in a countersink in the plate, the improvement comprising:
flexible web means composed of a polymeric material, integrally formed with said plate and extending into said aperture, for engaging a portion of said threaded member when said portion is inserted into said aperture to captivate, retain and align the threaded member in the plate for ease of insertion of the threaded member into the threaded bore.

32. The plate according to claim 31, wherein said web means comprises two webs located on opposite sides of said aperture.

33. The plate according to claim 32, wherein said aperture is substantially circular, and said webs each have a distal edge forming a chord of said circular aperture.

34. The plate according to claim 31, wherein said web means is formed of a thermoplastic material.

35. In the combination of a wall plate having an aperture extending through the plate and a screw member inserted into the aperture, the screw member having an externally threaded body and a head, the outermost peripheral portion of said head having an underlying surface, the improvement comprising:
the plate being comprised of a polymeric material having first and second opposite respective sides, said aperture having an annular portion tapering inwardly from the first side of the plate upon which the underlying surface of the screw head seats; and
at least one flexible web means unitary with the plate and extending into said aperture, said web means located adjacent the second side of the plate for engaging said threaded body of said screw member when said screw member is fully inserted into said aperture with the underlying surface of said screw head seating against said tapering portion of the plate, whereby said screw member is retained therebetween substantially perpendicular to the plate.

36. A plate for completing the enclosure of an outlet box comprising:
a flexible body portion composed of thermoplastic material;
means defining a substantially circular aperture in said body portion;
a pair of opposed, flexible webs integrally formed with said body portion and extending into said aperture,
said webs each having a distal edge forming a chord of said circular aperture,
said distal edges of said webs being substantially parallel;
an inwardly and downwardly tapered frustoconical bore formed in said body portion coaxial with said circular aperture;
a cylindrical bore formed in said body portion between said frustoconical bore and said webs and coaxially aligned with said frustoconical bore; and
an opening in said body portion for receiving a part of an electrical wiring device coupled to the outlet box.

* * * * *